J. G. STEPHENSON & L. S. BURROUGHS.
Hand-Cars.

No. 154,925. Patented Sept. 8, 1874.

Witnesses:
A. K. Parris
G. B. Towles

Inventors:
Jas. G. Stephenson
Levi S. Burroughs
by Myers & Co. Atty's

UNITED STATES PATENT OFFICE.

JAMES G. STEPHENSON AND LEVI S. BURROUGHS, OF SULPHUR SPRINGS, OHIO.

IMPROVEMENT IN HAND-CARS.

Specification forming part of Letters Patent No. 154,925, dated September 8, 1874; application filed February 6, 1874.

*To all whom it may concern:*

Be it known that we, J. G. STEPHENSON and L. S. BURROUGHS, residents of Sulphur Springs, in the county of Crawford and State of Ohio, have invented certain new and useful Improvements in Hand-Cars; and we do hereby declare the following to be a full, clear, and exact description of the invention, such as will enable others skilled in the art to which it pertains to make and use it, reference being had to the accompanying drawings, which form part of this specification.

Figure 1:
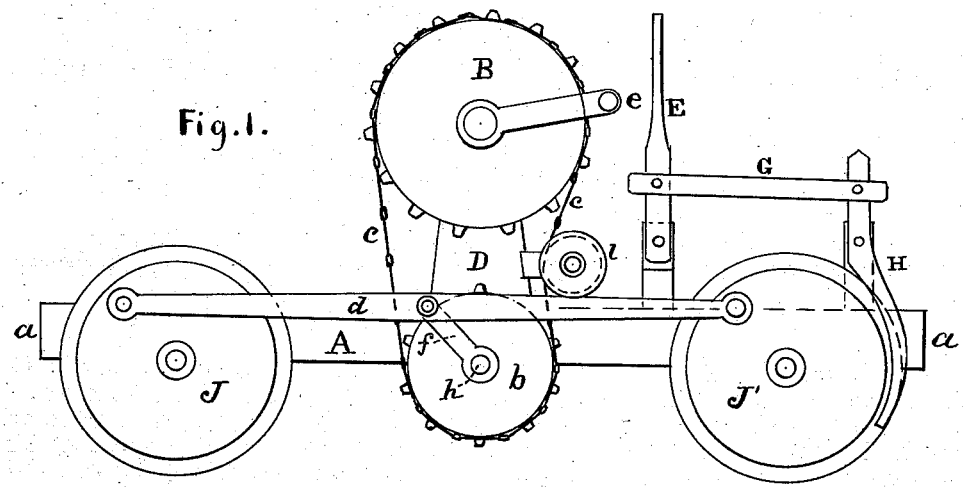
Figure 2:
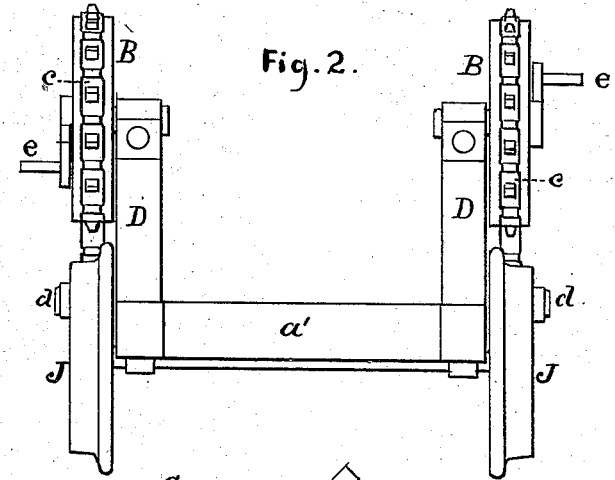
Figure 3:
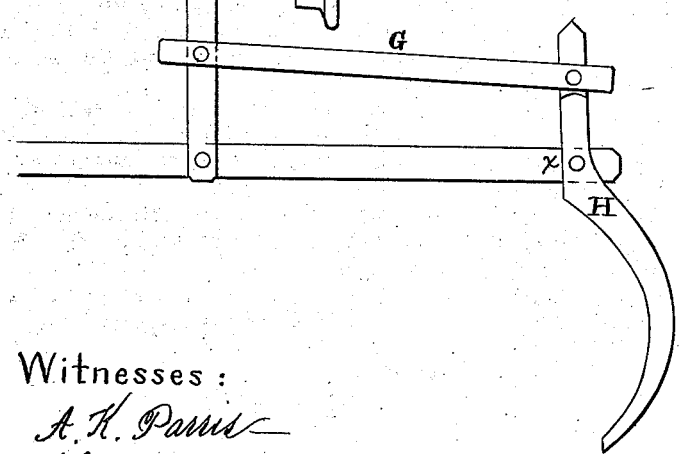

In the drawings, Figure 1 represents a side elevation of my device. Fig. 2 is a lateral view. Fig. 3 is a detached plan view of my car-brake.

My invention relates to an improvement in hand railroad-cars, with hand-power as a motor for their propulsion, and a brake to regulate their velocity. It consists of the truck A, the driving-wheels B and $b$, operated by chain-belts $c$, driving-shafts $a$, cranks $e$ and $f$, standards D, switch-lever E, longitudinal bar G, and the friction-check H.

A is the truck or body of the car, provided with the wheels J and J'. The truck may be constructed to comprise the longitudinal pieces $a$ and transverse pieces $a'$, or in any of the well-known methods. B and $b$ are driving-wheels, on either side of the car, at a point intermediate between the truck-wheels J and J', the larger wheels B being arranged in a vertical line above the small wheels $b$. The bearings of the wheels B are located in the vertical standards D, and said wheels are provided with the cranks $e$ for rotating the same. The two small wheels $b$, located on either side of the car, are connected by the transverse axle $h$, and have their bearings in journal-boxes rigidly attached to the longitudinal sides of the truck. These wheels can be disconnected by an axle, when preferable, and arranged to rotate independently. The driving chain-belts $c$ clutch upon spurs, which project outwardly from the periphery of the wheels B and $b$, in the manner which ordinarily obtains in the construction of similar devices. The said chain-belts pass on the small wheels $l$, supported at a suitable distance from the peripheries of the wheels B and $b$, as shown in the drawing. E represents a vertical bar, pivoted to the longitudinal side of the car, and also to the longitudinal piece G, which latter is pivoted to the friction-clutch H. The friction-clutch works on a pivot at $x$, and is operated indirectly by the handle E, which, when pressed forward, breaks the speed of the car, by causing the friction-clutch H to press against the wheel.

We claim—

1. The combination of the driving-wheels B and $b$, provided with cranks $e$ and $f$, with the driving-shafts $d$ and car-wheels J J', chain-belts $c$, and wheels $l$, as and for the purpose described.

2. The combination, with the car, of the brake-handle E, longitudinal bar G, and friction-brake H, constructed to operate as set forth.

In testimony that we claim the foregoing we have hereunto set our hands this 12th day of January, 1874.

JAMES G. STEPHENSON.
LEVI S. BURROUGHS.

Witnesses:
E. S. PATTERSON,
JOHN B. SQUIER.